Jan. 21, 1969  F. W. JOHNSON  3,422,535
DENTAL SHELL CROWN
Filed Oct. 19, 1965

INVENTOR.
FRANK W. JOHNSON
BY
Christie Parker & Hale
ATTORNEYS.

United States Patent Office 3,422,535
Patented Jan. 21, 1969

3,422,535
DENTAL SHELL CROWN
Frank W. Johnson, Monrovia, Calif., assignor to Unitek Corporation, Monrovia, Calif., a corporation of California
Filed Oct. 19, 1965, Ser. No. 497,622
U.S. Cl. 32—12        6 Claims
Int. Cl. A61c 5/08

ABSTRACT OF THE DISCLOSURE

A dental shell crown for temporary protection of a tooth. The crown is formed of a soft, malleable metal such as aluminum, and the metal surfaces are covered by an electrically insulating dielectric layer or coating. Preferably, the dielectric coating is an anodized layer on the aluminum surface. The anodized layer can be dyed to provide a pleasing color, and the crown preferably has a preformed occlusal surface and pretrimmed sides.

BACKGROUND OF THE INVENTION

This invention relates to a dental shell crown, and specifically to a shell crown which is provided with an electrically insulated outer surface.

Shell crowns are used in dentistry as temporary caps to cover and protect an exposed tooth while a permanent restoration (such as an inlay, onlay, or cast crown) is being prepared. In such restorative work, the dentist prepares the affected tooth by removing decayed regions and providing slots or keyways in the tooth to engage the subsequently installed restoration. A wax impression of the prepared tooth is then taken, and the impression used to make a mold in which the restoration will be cast.

Casting and finishing of the restoration may take several weeks, and the prepared tooth must be protected during this interim period. If the prepared tooth is being treated, the dentist may desire to extend the interim period before permanent installation of the restoration in order to observe treatment progress. There is therefore required a relatively sturdy cap which can be temporarily installed to permit the patient to chew normally during the interim period, and to protect the temperature- and pressure-sensitive tooth dentin which is exposed in the prepared tooth.

In the past, several types of such temporary caps or shell crowns have been used. The anterior teeth are usually adequately protected by a plastic shell crown as these teeth are not subjected to high pressures during chewing or biting. The posterior teeth (molars and bicuspids), however, require a structurally strong shell crown in order to withstand the severe occlusal pressures which exist during biting or chewing. Furthermore, the shell-crown material should be relatively soft and malleable whereby it can be shaped to mate with the occlusal surface of an opposing tooth. Shaping is accomplished by having the patient exert a biting force on the installed shell crown.

A relatively soft grade of aluminum has been found to be a satisfactory material for posterior-tooth shell crowns. Other materials such as brass and tin have been tried, but usually rejected due to excessive softness, severely disagreeable taste, toxicity, and other drawbacks. Aluminum is inexpensive, relatively passive, easy to form, and is sufficiently soft and malleable that the occlusal surface of the shell crown can be shaped by "biting."

Although aluminum shell crowns have been used for many years, they have proved to be a source of annoyance and discomfort to the wearer due to galvanic action which exists between the shell crown and dissimilar-metal bodies elsewhere in the wearer's mouth. These bodies are typically gold restorations or silver-amalgam fillings installed on other teeth in the mouth. Saliva acts as an electrolyte, and a substantial galvanic potential difference appears between the shell crown and the dissimilar-metal bodies.

This galvanic action manifests itself in several ways. The potential difference existing between the aluminum shell crown and a dissimilar-metal body results in an unpleasant "acid" taste similar to that experienced when one's tongue is disposed across the terminals of a low-voltage battery. In some individuals, the galvanic potential may actually be sufficient to cause a periodic spark between the shell crown and the dissimilar-metal body, producing a startling, uncomfortable sensation.

The galvanic action may further cause the aluminum to go into solution in the saliva. This results in gradual erosion of the shell-crown surface, and also produces an unpleasant metallic taste. In addition to the problems arising from galvanic action, conventinal aluminum shell crowns are aesthetically objectionable in that the natural color of aluminum is cosmetically unattractive in the mouth.

The shell crown of this invention overcomes these problems by incorporating an electrically insulating dielectric coating or layer on its outer surface. This coating electrically isolates the metallic shell crown from dissimilar metallic bodies in the wearer's mouth, preventing galvanic shock, shell-crown erosion, and the unpleasant taste resulting from the above-described electro-chemical reactions. The desirable electrical properties of a plastic anterior shell crown are thus achieved, while still retaining the necessary qualtities of strength and malleability associated with a conventional metal posterior-tooth shell crown.

Briefly stated, the shell crown of this invention comprises a malleable metal shell generally conformed to enclose a tooth on which restoration work has been commenced. A dielectric coating is formed on the outer surface of the shell, whereby the shell is electrically insulated from adjacent metallic bodies in the patient's mouth.

Preferably, the shell is formed of soft aluminum, and the dielectric coating comprises an anodized layer on the surface of the aluminum shell. A gold-colored dye may be disposed in the anodized layer to improve the appearance of the shell crown. Preferably, the shell crown includes a preformed occlusal surface, and has pre-trimmed sides which terminate at approximately the gingival line of the tooth to be protected.

The invention will be described in detail with reference to the attached drawings, in which.

Figure 1:
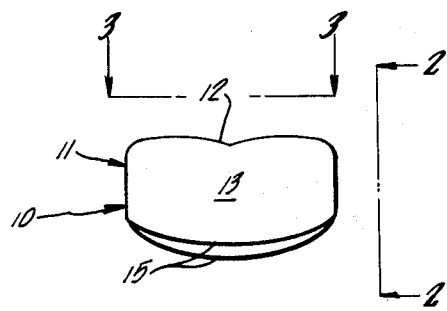
FIG. 1 is an elevation of a dental shell crown according to the invention.
Figure 2:
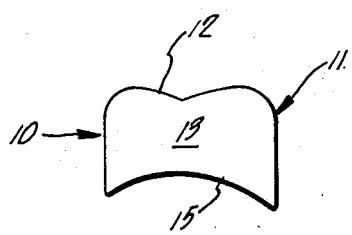
FIG. 2 is an elevation taken along line 2—2 of FIG. 1.
Figure 3:
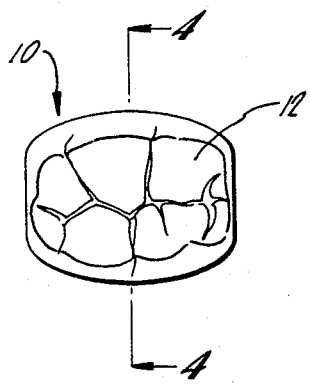
FIG. 3 is an occlusal plan view taken on line 3—3 of FIG. 1.

Referring to FIGS. 1–4, a dental shell crown 10 includes a cup-shaped shell 11 with an occlusal surface 12 and a side portion 13 which depends from the occlusal surface. Preferably, the end of the side portion away from the occlusal surface is trimmed to a gingival contour 15 whereby the side portions will terminate at approximately the gingival line of an average tooth when the shell crown is installed on the tooth. The occlusal surface is also preferably preformed to match the average anatomical configuration of a tooth on which the shell crown is to be installed.

It is to be understood that the shell crown would normally be manufactured in several different preformed shapes, and one shape being suitable for first molars, another being suitable for second bicuspids, etc. Such preforming greatly reduces the effort required for the dentist to fit the shell crown to a specific tooth, minimizing chair time and patient discomfort.

The shell is formed of a relatively soft, malleable metal such as aluminum of about 0.007-inch thickness, whereby the occlusal surface may be configured to mate properly with an opposing tooth by having the patient "bite" against the occlusal surface after installation of the shell crown.

Figure 4:
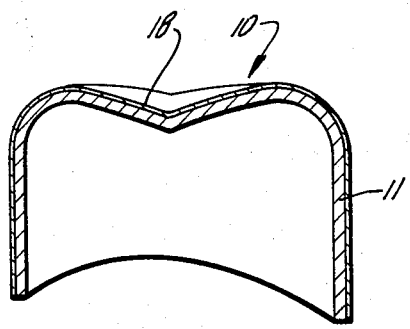
FIG. 4 is an enlarged cross-sectional elevation of the shell crown taken on line 4—4 of FIG. 3.

Referring to FIG. 4, a cross-sectional view of the shell crown shows a dielectric coating 18 formed on the outer surface of shell 11. The dielectric coating may be formed from conventional dental ceramic or epoxy materials suitable for use in the mouth and having good electrical insulating qualities.

Figure 5:
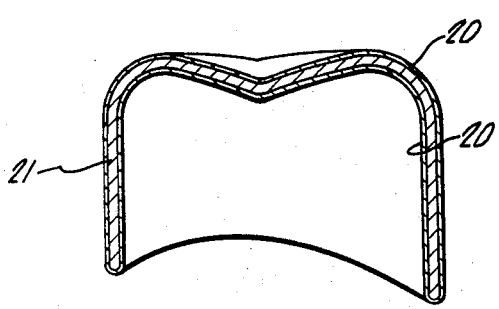
FIG. 5 is a cross-section similar to FIG. 4, showing an anodized layer on the surface of the shell crown.

In a preferred form of the invention as shown in FIG. 5, the dielectric coating is achieved by forming an anodized layer 20 on at least the outer surface of a soft-aluminum shell 21. The anodized layer has excellent electrical insulating characteristics and is sufficiently malleable to yield without fracture to occlusal-surface deformation when contacted under pressure by an opposing tooth. The anodizing process has the further advantage of being inexpensive, and controllable whereby the thickness of the anodized layer may be determined with good accuracy. The anodizing process is well known to those skilled in the art, and, for brevity, will not be described in detail.

Although the insulating dielectric coating is required on only the outer surface of the shell crown, it is more conveniently applied to all surfaces to eliminate the need for blanking or masking during the anodizing process. Thus, in FIG. 5, both the inner and outer surfaces of the shell crown are anodized. An anodized layer having a thickness of approximately 0.0010 to 0.0015 inch has been found to yield very satisfactory insulation qualities. Thicker anodized layers are to be avoided to insure adequate malleability whereby the layer will yield without fracture under biting and chewing pressures.

Another feature of the anodized layer is that it readily accepts a colored dye. Thus, for example, a gold-colored dye may be disposed in the anodized layer prior to the sealing step in the anodizing process. The resulting shell crown is much more pleasing from the cosmetic standpoint than the conventional color of bare aluminum as used in earlier shell crowns. Colored dyes such as are used on anodized aluminum drinking glasses and other food utensils have been clinically tested and found satisfactory for use in the mouth.

Figure 6:
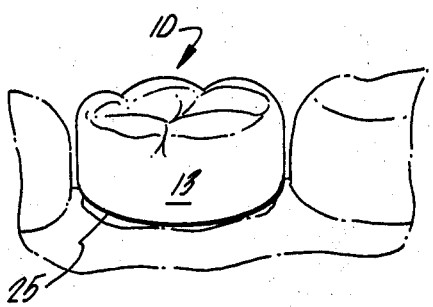
FIG. 6 is a perspective view of the shell crown installed on a tooth.

In FIG. 6, the shell crown of this invention has been installed on a tooth 25 to provide temporary protection of the tooth while an inlay is being cast and finished. The shell crown is secured in place with a conventional dental adhesive paste.

There has been described a novel dental shell crown which includes an electrically insulating dielectric layer on at least its outer surface to overcome deficiencies of conventional aluminum shell crowns which have been used for many years. Although the invention has been described with specific reference to a layer formed by anodizing the surface of an aluminum shell crown, it is to be understood that the scope of the invention extends to include shell crowns formed of other metals and insulating layers formed of other dielectric substances.

I claim:

1. A dental shell crown for covering and protecting a tooth in a human mouth upon which tooth restoration work has been commenced, comprising a malleable soft metal shell generally conformed to enclose the tooth, the shell being sufficiently soft to be conformable to an opposing tooth when pressed by the opposing tooth, the shell being formed of a metal which produces galvanic action when associated with a dissimilar dental metallic material in the presence of saliva in the human mouth, and a dielectric anodized coating adhered to the outer surface of the shell, the coating being sufficiently thin to be malleable to yield without fracture and to conform to the shell during deformation of the shell under pressure by an opposing tooth and being sufficiently thick to prevent such galvanic action.

2. A dental shell crown according to claim 1 wherein the metal shell has a preformed occlusal surface and pretrimmed sides which terminate at approximately the gingival line of the tooth.

3. A dental shell crown according to claim 1 wherein the shell is formed of aluminum.

4. A dental shell crown according to claim 1 wherein the dielectric anodized coating has a thickness not exceeding approximately 0.0015 inch.

5. A dental shell crown according to claim 1 having a colored dye disposed in the anodized coating.

6. A dental shell crown according to claim 5 wherein the dye is gold colored.

References Cited

UNITED STATES PATENTS

| | | | |
|---|---|---|---|
| 43,588 | 7/1864 | Johnson | 32—2 |
| 1,379,063 | 5/1921 | Van Allen | 32—12 XR |
| 1,414,475 | 5/1922 | Kochmit | 32—12 XR |
| 2,118,934 | 5/1938 | Madzar | 32—12 |
| 2,930,124 | 3/1960 | Pos | 32—12 |

OTHER REFERENCES

Journal of Society of Dyers & Colourists, June 1948, p. 215.

Temporary Fillings and Temporary Crowns, J. J. Messing, British Dental Journal, Jan. 21, 1964, pp. 57–58.

ROBERT PESHOCK, *Primary Examiner.*